(12) United States Patent
Shoup et al.

(10) Patent No.: US 6,905,772 B2
(45) Date of Patent: Jun. 14, 2005

(54) ABRASION AND IMPACT RESISTANT COATING COMPOSITIONS, AND ARTICLES COATED THEREWITH

(75) Inventors: Robert Shoup, Bonita Springs, FL (US); Norman Rice, Andover, MA (US); Dorette Simes, Haverhill, MA (US); Jon Nebo, Waltham, MA (US); George T. Georges, Malden, MA (US)

(73) Assignee: Triton Systems, Inc., Chelmsford, MA (US)

( * ) Notice: Subject to any disclaimer, the term of this patent is extended or adjusted under 35 U.S.C. 154(b) by 0 days.

(21) Appl. No.: 10/319,969

(22) Filed: Dec. 16, 2002

(65) Prior Publication Data

US 2003/0157344 A1 Aug. 21, 2003

Related U.S. Application Data

(63) Continuation-in-part of application No. 09/616,820, filed on Jul. 15, 2000, now abandoned.
(60) Provisional application No. 60/206,592, filed on May 23, 2000.

(51) Int. Cl.[7] .................... B32B 27/08; B32B 15/08; C08G 77/00
(52) U.S. Cl. ................ 428/447; 428/429; 428/450; 524/858; 528/16; 528/22; 528/25; 528/26; 528/33; 528/34; 528/35
(58) Field of Search ................. 428/412, 446, 428/447, 448, 450, 428, 429; 528/10, 12, 14, 16, 22, 25, 26, 33, 34, 35, 37; 524/858

(56) References Cited

U.S. PATENT DOCUMENTS

| | | | | |
|---|---|---|---|---|
| 5,645,939 A | * | 7/1997 | Yoneda et al. | 428/429 |
| 6,342,097 B1 | * | 1/2002 | Terry et al. | 106/287.13 |
| 6,348,269 B1 | | 2/2002 | Terry | |
| 2002/0061407 A1 | * | 5/2002 | Colton et al. | 428/447 |
| 2003/0165686 A1 | * | 9/2003 | Blackburn et al. | 428/412 |

* cited by examiner

*Primary Examiner*—Michael J. Feely
(74) *Attorney, Agent, or Firm*—Raymond A. Miller; Pepper Hamilton LLP

(57) ABSTRACT

Disclosed are abrasion and impact resistant coating compositions, and substrates coated therewith. These coating compositions provide high abrasion and impact resistance, chemical protection to the substrate, and exhibit enhanced stability to high temperature and high humidity conditions. Coating compositions may also be tailored to provide a balanced combination of abrasion resistance, impact resistance, and weatherability. These coatings may be transparent or not, depending on the intended applications. These coatings may also comprise additives such as UV absorbers, corrosion inhibitors, and electrically conductive materials. Substrates for use herein may be plastic or metal.

24 Claims, No Drawings

ABRASION AND IMPACT RESISTANT COATING COMPOSITIONS, AND ARTICLES COATED THEREWITH

CROSS REFERENCE TO RELATED APPLICATIONS

This is a continuation-in-part application claiming the benefit of and priority to now abandoned U.S. application Ser. No. 09/616,820 filed on Jul. 15, 2000, which claims the benefit of U.S. Provisional Application No. 60/206,592, filed on May 23, 2000.

STATEMENT REGARDING FEDERALLY SPONSORED RESEARCH

This invention was made with U.S. Government support under Contract No. N68335-01-D-0125 monitored and funded by the Naval Air Warfare Center, and Contract No. N00421-97-C-1397 monitored and funded by the Naval Air Warfare Center, the headquarters of which is the Naval Air Systems Command. The Government has certain rights in the invention.

TECHNICAL FIELD

The present invention relates generally to siloxane based coating compositions, more specifically to such coating compositions for application to substrates. These coatings provide superior abrasion and impact resistance, chemical protection to the substrate, and exhibit enhanced stability to high temperature and high humidity conditions. The present invention also relates to substrates, plastic or metal, coated with such compositions.

BACKGROUND

Plastics, particularly polycarbonate (PC) substrates, provide unique properties such as transparency, lightweightedness, handleability, and ease of formability. These properties make them especially useful as substitutes for glass in many applications. However, plastic substrates do have their shortcomings in that typically they are soft and scratch readily. Thus, several siloxane-based curable resin systems have been developed to provide exceptionally hard, abrasion resistant protection for plastics approaching that of glass itself. These siloxane-based coatings are considered to be the premier coatings in the plastic sheet and lens market today.

A number of improvements in these silane-based compositions have been developed in the last 30 years that have resulted in improved coatings for plastics in a number of aspects. For instance, in the late '70s, coating compositions containing at least one hydrolyzate of an epoxysilane, a polycarboxylic acid or anhydride crosslinker, and a curing agent for the epoxy functionality were developed. Although these coatings provided protection to plastic surfaces, such as polycarbonates, they were not particularly abrasion resistant compositions.

In the early '80s, siloxane formulations comprising at least two hydrolyzates of: 1) an epoxy silane, and 2) a trifunctional silane, predominately methyltrimetboxysilane (MTES); aqueous colloidal silica; the aforementioned crosslinkers and curing agents were developed. These compositions did not prove to be particularly abrasion resistant due to suppression of crosslinking by the blocking methyl group in the trifunctional silane, MTES.

In the '90s, efforts were successful in increasing the silane network crosslinking (and thereby increasing the abrasion resistance) by replacing the trifunctional silane (MTES) with the tetrafunctional silane, e.g., tetraethoxysilane (TEOS). Most of the other components of earlier formulations were retained, namely, the epoxy silane, the acid crosslinker, the curing agent (where needed), and optionally, the aqueous basic colloidal silica sol ($Na^+$ stabilized sol). The $Na^+$ stabilized sol with pH in the 9 to 10 range presents some issues in the mixing process, because the final pH of the composition is acidic, typically between about 4 and about 5.5. If the silica sol is not properly added, it can lead to flocculation, as the sol must transverse the neutral pH range where silica is very unstable. This can force a change in the order of addition of the silica sol in certain compositions. Also, residual alkali may be present in the coatings derived from these compositions, which may not be desirable in certain applications.

Many of the aforementioned coating compositions do not provide adequate protection under a variety of conditions. Maintenance of internal cohesive strength has been a problem for many plastic substrates coated with abrasion resistant coatings, particularly under extreme climatic conditions. Cohesive failure results in cracking and peeling of the abrasion resistant coating, and thereby exposing the underlying substrate to abrasion, pitting, and physical or chemical attack.

Another existing problem relates to particular commercial applications of coated polymeric substrates, which applications require the coatings to withstand high temperature and high humidity for long time periods (years) (e.g., auto windows). When tested for this requirement, via accelerated tests such as exposure to boiling water, most of the aforementioned abrasion resistant coatings fail in less than 1 hour due to a crazing mechanism.

SUMMARY OF INVENTION

Use of siloxane based compositions for coating substrates to achieve abrasion and impact resistance are known and practiced. However, the existing coatings exhibit cohesive failure (i.e., crazing) which leads to the exposure of the base substrate to attack by chemicals, UV and/or weather extremes, as well abrasion by mechanical forces.

In view of the above, there is a need for coating compositions that exhibit high abrasion and impact resistance, good adhesion, cohesive strength adequate for the desired application, and stability to high temperature and high humidity conditions, while providing chemical protection to the substrate. There is also a need for coating compositions that exhibit a balanced combination of abrasion resistance, impact resistance and weatherability. It is also desirable to have coatings that are transparent.

It is, therefore, an object of the present invention to provide coating compositions exhibiting high impact resistance, or high abrasion resistance, or high weatherability.

It is another object of the present invention to provide coating compositions exhibiting a balanced combination of impact resistance, abrasion resistance, and weatherability.

It is another object of the present invention to provide coating compositions that are versatile so that they could be used in a variety of applications.

It is another object of the present invention to provide coated substrates that resist chemical attack.

It is a further object of the present invention to provide coated substrates that resist UV degradation.

The present invention relates to siloxane based coating compositions for application to substrates, particularly to plastic substrates. These coatings provide superior abrasion and impact resistance, chemical protection to the substrate, and exhibit enhanced stability to high temperature and high humidity conditions. These siloxane compositions are production friendly, show acceptable shelf life stability, and cure readily. Moreover, substrates, particularly plastic substrates such as polycarbonate ("PC") and acrylics, coated with these abrasion and impact resistant coatings prove to be surprisingly strong structures with durable adhesive layer, and demonstrate excellent optical transparency. Further, when applied to metal substrates, these coating compositions provided corrosion resistance.

In one embodiment of the present invention, compositions exhibit a balanced combination of abrasion resistance, impact resistance and weatherability. This is achieved by the proper blending of starting components (hardener, toughener, optional filler, acid, and catalyst), which upon hydrolysis and condensation, form stable (months under refrigeration) mixtures of silane precondensates. Upon application and thermal curing, these solutions provide tough skeletal coatings that have a blend of hardness and flexibility that can absorb shock of impact and can resist abrasion damage to the coated substrate.

In another embodiment where high impact resistance is predominantly desired, an intermediate primer-coating layer may be included between the substrate and the abrasion resistant coating layer. A very thin transparent elastomeric primer layer may provide strong adhesion for both surfaces, and, simultaneously, can serve as an energy absorbing layer that enhances resistance to impact damage to the overall coating composite.

In yet another embodiment, where high abrasion resistance is predominantly desired, the inorganic network (i.e., the hardener and/or filler components) is increased to enhance the hardness aspect of the composition.

Any of the disclosed embodiments may include other components, such as UV absorbers, silicone or fluorosurfactants, flow control agents, corrosion inhibitors, electrically conductive materials, colorants, dyes, binders such acrylic or vinyl silanes, and polyfunctional imides for additional crosslinking function.

The above summary of the present invention is not intended to describe each illustrated embodiment or every implementation of the present invention. The detailed description, which follows, particularly exemplifies these embodiments.

DETAILED DESCRIPTION OF EXEMPLARY EMBODIMENTS

The present invention relates to siloxane based coating compositions for application to substrates, that provide superior abrasion and impact resistance and chemical protection to the substrate, while exhibiting enhanced stability to severe climatic conditions. The coating compositions described herein may be applied to plastic substrates, particularly where the intended applications require transparent coatings. These coatings can also be applied to metals, such as aluminum and steel, where optical transparency may not be necessary.

A key to developing coatings with balanced combination of abrasion resistance, impact resistance, and weatherability is the proper blend of components, which, upon hydrolysis and condensation form precondensate compositions that are stable for several months if stored under refrigeration. The term "weatherability", as used herein, refers to the ability of a coating to withstand extreme climatic conditions (as demonstrated by accelerated tests, such as immersion in boiling water). Upon application and thermal cure, these compositions provide tough hybrid coatings that are a blend of hardness (inorganic matrix) and flexibility (organic matrix) that can absorb shock of impact and can resist abrasion damage to the coated substrate. The hardness and flexibility characteristics are key to abrasion and impact resistance properties of a coating.

Coatings can be tailored for the intended applications with respect to properties, e.g., abrasion resistance, impact resistance, and weatherability. In one embodiment, the coating composition is formulated to result in high abrasion resistance, however, this may be at the expense of impact resistance and/or weatherability. In another embodiment, the coating composition is formulated to result in high impact resistance, however, this may be at the expense of the hardness component of abrasion resistance. In yet another embodiment, the coating composition is formulated to result in weatherability, however, this may be at the expense of the hardness component of abrasion resistance. In a further embodiment, the coating composition is formulated to result in a balanced combination of properties, i.e., abrasion resistance, impact resistance, and weatherabililty, by manipulating the components of the composition which thereby effects the hardness and flexibility of the coating.

The following components comprise the composition.

Composition Components

1. Toughener

The toughener for use herein is a hydrolyzable epoxy silane, 3-glycidoxypropyl-trimethoxysilane (GPTMS), Formula 1 (available from Gelest, Inc., Tullytown, Pa.). GPTMS is classified as a "toughener" because it provides oligomeric flexibility to the overall hard brittle silica network. It requires a catalyst for cure of the epoxy ring during thermal cure to create interpenetrating oligomeric chains throughout the hybrid network.

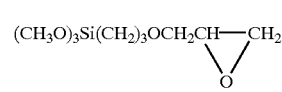  [Formula 1]

2. Hardener

The hardener for use herein is a hydrolysable silane that provides a nanoscale silica matrix that promotes a dense packing arrangement with colloidal silica fillers and other silane precondensates. Hardeners for use herein are tetrafunctional alkoxysilanes (Formula 2), hexafunctional alkoxysilanes (Formula 3), or a combination of the two.

  [Formula 2]

  [Formula 3]

wherein R is an alkyl group having 1 or 2 carbons, and x is 2 to 6.

The preferred tetrafunctional alkoxysilane for use in the present invention is tetraethylorthosilicate (TEOS) (available from Gelest, Inc., Tullytown, Pa.), and the preferred hexafunctional alkoxysilane is Bis(triethoxysilyl) ethane (BTSE) (available from Gelest, Inc., Tullytown, Pa.).

The hexafunctional alkoxysilane structure contains a short hydrocarbon chain in the backbone that may provide additional flexibility. Coating compositions containing hexafunctional alkoxysilanes, such as BTSE, have demonstrated unexpected stability to boiling water tests in excess of 8 hours.

Combinations of tetraethylorthosilicates and hexafunctional alkoxysilanes may also be useful herein.

3. Filler

The filler component of the present invention is optional. When included, the filler is an inorganic material that is at least one of an oxide, oxyhydrate, nitride or carbide of Si, Al, Zn, Zr, or any combination thereof that is capable of being disbursed as a colloidal solution. Examples of specific colloidal solutions of interest are aqueous silica sols, aqueous alumina (surface) modified silica sols, and organic solvent based silica sols.

There are some advantages that can accrue from the inclusion of a filler in such coating compositions. First, these colloidal solutions possess very uniform spherical particles in size range of from about 4 nm to about 20 nm, and preferably from about 9 nm to about 14 nm. Second, they can contribute significantly to a close packing arrangement. The hydrolysis of the precondensates produces particles in the range of about 1 nm to about 2 nm, in diameter.

The combination of the about 9 nm to about 14 nm silica filler particles with the about 1 nm to about 2 nm precondensate particles creates a bimodal distribution of spheres that packs exceptionally well. Considering that small spheres pack within the spaces created by closely packed larger spheres, powder packing studies have shown that 2 lots of spheres with a size ratio of 7:1 can be vibratorily packed to a density greater than 80%. Thus, these compositions with controlled particle sizes and close packing, coupled with a uniform distribution of flexible oligomer chain structures create a coating matrix with desired density, toughness, and hardness properties. Organic solvent based silica sols epitomize this packing principal as they show very low Taber abrasion damage values (as illustrated in Table 2 and 3, Examples 1, 2, 12 and 14) when used in conjunction with the tetrafunctional silane hardener, TEOS. The organic sols are also very user friendly in manufacturing as they can be mixed into precondensates at any stage, and they are free of alkalis (which may not be desirable in the resulting coatings for use in certain applications).

Colloidal silica, such as Nissan NPC-ST (in 2-propoxyethanol), Nissan IPA-ST (in isopropyl alcohol) (available from Nissan Corp., Houston, Tex.), and commercially available sols similar to these Nissan sols, are preferred organic sol fillers in coating compositions of the present invention where the composition also comprises TEOS. This combination of components is particularly useful where the intended application requires high abrasion resistance.

In one embodiment of the present invention, the filler is an $Al^{+3}$ modified silica sol, such as Ludox® AM (from E.I. DuPont & Co., Wilmington, Del.) or similar commercially available products from other manufacturers. Due to the acidic nature of the Al/Si surface, these particles can function both as a filler and as a catalyst for epoxy thermal curing. In compositions where $Al^{+3}$ modified silica sol is used, an additional catalyst is not typically necessary. Further, these sols are particularly stable for inclusion in the precondensates of the present invention, which are primarily acidic systems. The substitution of $Al^{+3}$ for $Si^{+4}$ creates an imbalance in surface charge, which is balanced by a permanent absorption of hydroxyl ion. The net negative charge is the result of chemical modification of the particle surface and is independent of pH. This permanent surface charge aids in the pH adjustment from about 10 to about 3–5 that is necessary for mixing the $Al^{+3}$ modified silica sol into the precondensate. Despite the difficulties associated with adjusting the pH of the commercially available sols, the resulting composition will be more stable than those containing no Alumina modified surfaces.

4. Acid

In the present invention, acid functions both as a pH control for silane hydrolysis (typically between pH of about 3 and about 5) and as a crosslinker in the coating composition. Acids suitable for use herein are organic acids that can provide complex formation with both the epoxy functional groups and various other hydrolyzed silane precondensates. These acids appear to provide stability to the precursor coating solution as well as enhancing the abrasion resistance of selected compositions. Examples of such acids for use herein include polycarboxylic acids, and examples of polycarboxylic acids include itaconic, succinic, malonic, glutaric, adipic, and pimelic acid, maleic and fumeric acid. Cyclic anhydrides of succinic, glutaric, phthalic, and maleic may also be useful. (These acids are available from various manufacturers, such as Avocado Research Chemicals Ltd., located in Heysham, Lancs, and Acros Organics, located in Fairlong or Sommerville, N.J.).

The acid may be incorporated into the compositions of the present invention at concentrations of from about 0.5% to about 5%, and preferably from about 1% to about 3%, of the coating solution wherein the solids content is from about 15% to about 30%, and preferably from about 20% to about 25%.

Where polyfunctional imides are incorporated into the coating compositions for the additional crosslinking function, higher concentration of acid may be necessary for pH adjustment.

5. Catalyst

Catalyst is incorporated into the coating compositions of the present invention to open the epoxy ring and polymerize the resulting chains of the GPTMS. This leads to further epoxide-epoxide and epoxide-polyol crosslinking to provide flexibility or toughness to the mostly rigid silica matrix. Without the hydrocarbon chains, the silica network would be brittle and would craze. Catalysts suitable for use herein are bases, such as organic amines, amides, imidazoles, and inorganic alkali hydroxides. Basic catalysts are necessary in compositions where a filler is not present or an organo silica filler is used. An example of an organic amine for use herein is NN-dimethylbenzylamine (available from Acros Organics, Fairlong or Sommerville, N.J.).

Some basic catalysts can increase the hydrolysis and condensation rates of the silanes, leading to shortened shelf life. By storing the solutions under refrigeration (about 5° C.), the dynamics of these reactions are slowed substantially. In some cases, shelf life can be substantially increased by omitting the catalyst during storage, and adding it prior to coating.

Catalysts also suitable for use in the present invention are modified silica sols, such as $Al^{+3}$ modified silica sol (e.g., Ludox® AM). Modified silica sols can serve both as the catalyst and as the filler in these coating compositions. Where modified silica sols are utilized in these compositions, the colloidal particles serve as matrix formers and their Lewis acid surfaces readily catalyze the epoxy functionality during thermal cure. These acid surfaces can also catalyze the condensation of silanol groups contributing to greater crosslinking of the inorganic silica network. No additional catalyst, such as an amine catalyst, is required, but can be added at the expense of shelf life. Coatings catalyzed by the $Al^{+3}$ modified silica sol demonstrate unexpected stability to boiling water testing, e.g., no crazing after 8 hours exposure.

Coating Compositions

In one embodiment of the present invention, the abrasion and impact resistant coating composition comprises GPTMS (toughener), BTSE (hardener), optional filler, acid, and catalyst. In another embodiment, the coating composition comprises GPTMS (toughener), TEOS (hardener), optional filler, acid, and catalyst (which may comprise $Al^{+3}$ modified silica sol). These components can be manipulated to achieve the desired properties in a coating.

For achieving a high abrasion resistant (addressing both hardness and toughness) coating, a preferred embodiment of the compositions of the present invention comprises GPTMS (toughener), TEOS (hardener), itaconic acid (acid), colloidal silica (e.g., Nissan NPC-ST or IPA-ST) (filler), and an amine catalyst, such as NN-dimethylbenzylamine.

In another preferred embodiment, the coating composition comprises of GPTMS (toughener), TEOS (hardener), itaconic acid (acid), and an $Al^{+3}$ modified silica sol (catalyst, but also serves as filler). This composition is formulated for achieving an enhanced stability to extreme climatic conditions (>8 hrs in boiling water) while exhibiting high impact resistance.

In another preferred embodiment, the coating composition comprises GPTMS (toughener), BTSE or a combination of BTSE and TEOS (hardener), Nissan NPC-ST organo silica sol (optional filler), itaconic acid (acid), and catalyst (an $A^{+3}$ modified silica sol, a basic organic amine, or a combination thereof). This composition is also formulated for achieving an enhanced stability to extreme climatic conditions (>8 hrs in boiling water).

Compositional ranges, wherein each component is utilized in each of the above-referenced embodiments, are shown in Table I.

TABLE I

Compositional Ranges

| Reagent | wt % Total Solids | wt % Total Solution |
|---|---|---|
| GPTMS | 45–65% | 12–20% |
| TEOS | 15–40% | 10–30% |
| BTSE | 20–40% | 10–30% |
| Colloidal SiO$_2$ | 5–20% | 5–20% |
| Acid | 4–12% | 0.5–5% |
| Amine catalyst | <0.01 (evaporates) | 0.1–0.3% |
| Al$^{+3}$ modified silica sol catalyst | 5–20% | 5–20% (having 0.2–0.5% Al$_2$O$_3$ component) |

Solvents for use in these coating compositions are typically selected to affect and maintain complete solubility or dispersion of the various composition components and their intermediate silane precondensates as formed during hydrolysis and condensation. It is desirable to have a mixture of solvents that are alcohols having high boiling points, between about 110 and 170° C., lower alcohols that are produced by hydrolysis of the silanes or added to maintain pot life during coating operations, and water in sufficient quantity to provide for complete hydrolysis of the alkoxysilane components. The solvents suitable for use herein must be compatible with the other components of the compositions. Examples of high boiling point solvents include propylene glycol methyl ether, 2-propoxyethanol, and 2-butoxyethanol. Lower alcohols suitable for use herein are ethanol, methanol, and isopropyl alcohol. This combination of low and high boiling alcohols provides a composition that dries in accordance with accepted coating practices wherein the solvents gradually evaporate to create a consistent continuous film. Solids control is maintained in a range of about 15% to about 30%, and preferably between about 20% and about 25% of the total solution weight.

The compositions of the present invention may also contain various additives, such as UV absorbers, silicone or fluoro-surfactants, corrosion inhibitors, electrically conductive materials such as electrically conductive polymers, colorants, dyes, binders such acrylic or vinyl silanes, and polyfunctional imides for additional crosslinking function. Flow control agents may also be incorporated (preferably at about 100 ppm to about 200 ppm, solution weight) into the coating compositions of the present invention where very smooth coatings with uniform thickness are desired. Examples of such flow control agents include PA 57—nonreactive silicone glycol copolymer surfactant (available from Dow Coming, Midland, Mich.) and Zonyl® surfactants—having the general formula F(CF2CF2)n (available from E.I. Dupont, Wilmington, Del.).

Coated Substrates

Substrates, particularly plastic substrates such as polycarbonate ("PC") and acrylics, are coated with the coating compositions described hereinabove. The coated substrates possess high cohesive strength and high resistance to damaging conditions as determined by one or a combination of standardized tests. In one embodiment, the coated substrate comprises 1) a substrate, 2) a first (primer) layer in contact with the substrate, and 3) a second layer, being the coating composition of the present invention, in contact with the first layer. The first layer acts as an intermediate adhesive primer layer between the substrate and the second layer. Such adhesive contact is quantified via a conventional adhesion test.

The use of a primer layer is optional when coating substrates with the compositions of the present invention; however, in order to achieve high impact resistance on polycarbonate substrates, a primer coating should be applied to the substrate. The thickness of the primer layer can be between about 0.1 um and about 2 um, and preferably between about 0.1 um and about 0.5 um for achieving adequate adhesion and absorption of impact energy. A large number of commercially available polymeric materials are suitable for use as primers and can find utility in the practice of the present invention. An aqueous polyurethane primer was used in the examples herein below.

Coating methods for either the primer layer or the second layer are not limited, and can be selected from conventional methods such as spinning, dipping, spraying or the like. The coating compositions of the present invention were cured at temperatures between 85° C. and 130° C. for a period of about 3 to about 8 hours.

In one embodiment of the present invention, the coated plastic substrate possesses a haze gain of less than about 4% as determined by a standard Taber Abrasion Test (at 500 cycles with 500 g. load), preferably less than about 1% to about 2%. In another embodiment of the present invention, the coated plastic substrate possesses an absent or negligible haze gain as determined by a standard high temperature/humidity test or a severe boiling water immersion test.

In another embodiment, where transparency is not a requirement of the intended application, the coating derived from the compositions of the present invention is not transparent.

In yet another embodiment, the abrasion and impact resistant coating compositions of the present invention are coated onto metals substrates, such as steel, aluminum, and etc.

EXAMPLES

Having generally described the invention, a more complete understanding thereof may be obtained by reference to the following examples that are provided for purposes of illustration only and do not limit the invention.

Example 1

163 g. GPTMS was added drop wise (about 25 ml/min) to 232 g. water that was chilled to between 10° C. and 16° C. in a vessel with strong stirring. 285 g. 2-propoxyethanol was then poured into the solution, followed by the addition of 22 g. itaconic acid powder which was allowed to dissolve while the solution warmed to room temperature ("R.T."). After the solution became homogeneous, 310 g. TEOS was added drop wise (25 ml/min) to the well-stirred solution. The solution was stirred about one hour before adding 53 g. Nissan NPC-ST silica sol by gentle pouring into the stirred solution. The resulting mixture was stirred overnight at R.T. before adding drop wise about 2.4 g. NN-dimethylbenzylamine. The pH of the resultant composition was about 4.2 and the viscosity about 7.1 cp. The composition was refrigerated at about 5° C. for a few days prior to coating and testing. Four 4"×4" primed PC plaques were dip coated with the composition to a coating thickness of about 4.7 um after curing at 130° C. for 4 hours. The plaques were tested for Bayer ratio and for abrasion resistance via Taber abrasion testing. The Taber test results yielded an average delta haze of 0.75%. The average Bayer ratio of the coated substrates was about 6.

The PC plaques used in this and following examples were primed with an aqueous polyurethane primer. The polyurethane primer was a dilution of aqueous polyurethane dispersion—Witcobond W-240 (available from Crompton Corporation, in Tarrytown, N.Y.), deionized water, and non-ionic fluorosurfactant—Zonyl® FSH (available from EI Dupont in Wilmington, Del.).

Procedures pertaining to the testing conducted with this and the other examples that follow are described hereinbelow.

Example 2

153 g. GPTMS was added drop wise to 250 g. chilled (10° C.–16° C.) water with strong stirring. After warming to R.T., 300 g. 2-butoxyethanol and 16 g. succinic anhydride was added to the vessel. When the anhydride was completely dissolved, 200 g. TEOS was added drop wise to the stirred vessel. After about 30 minutes of stirring, 90 g. Nissan NPC-ST silica sol was poured slowly into the vessel, and the closed vessel was stirred overnight at R.T. Next morning, 3 g. NN-dimethylbenzylamine in ethanol of equal volume was added drop wise while stirring. The resultant composition was refrigerated for several days. Four primed PC plaques were dip coated with the composition to a coating thickness of about 4.63 um after curing at 130° C. for 4 hours. The substrates were tested for Taber abrasion; the test results yielded an average delta haze of 1.36%, and a Bayer ratio of about 4.7.

Compositions of Examples 1 and 2 were coated unto about 30 plaques each as described above and tested for Taber abrasion, Bayer ratio, adhesion, and tumble abrasion. Table II shows the results of this testing.

TABLE II

Abrasion and Impact Resistance, Adhesion, and Humidity Cycle Tests

| Coating | Taber Abrasion (% delta haze) * | Taber Abrasion (% delta haze) # | Bayer Ratio * | Bayer Ratio # | Tumble Ratio # | Impact ** | Adhesion # | Humidity Cycle # |
|---|---|---|---|---|---|---|---|---|
| Com. A | 25.9 | 34 | 0.65 | 0.9 | 3.40 | NA | D4.2 | NA |
| Com. G | 5.85 | 8.39 | 1.12 | 1.4 | 4.97 | NA | D5 | D4.4–5.0 |
| Com. X | 1.39 | 0.93 | 4.8 | 7.4 | 6.12 | 2 of 10 failed | D5 | No effect |
| Of Ex. 1 | 0.75 | 0.57 | 6.0 | 10.6 | 6.95 | NA | D5 | No effect |
| Of Ex. 2 | 1.36 | 0.91 | 4.72 | 8.4 | 5.72 | 10 passed | D5 | No effect |

\* Testing conducted at Triton Systems, Inc. (4 substrates/test)
Testing conducted at Colts Laboratories, Clearwater, FL (10 substrates/test)
\*\* Testing conducted at AOTEC, Southbridge, MA
Com. A, Com. G, and Com. X - Commercially available coatings

Example 3

163 g. GPTMS was added drop wise to 270 g. cooled water in a stirred, jacketed vessel. The solution was allowed to return to R.T. as 300 g. 2-propoxyethanol was poured into the vessel followed by 16 g. itaconic acid powder. After total dissolution of the acid, 180 g. TEOS was added drop wise with strong agitation. About 30 minutes later, 172 g. Nissan NPC-ST silica sol was poured slowly into the solution, which was allowed to stir overnight in a closed container at R.T. Next morning, 3 g. NN-dimethylbenzylamine was added drop wise to the vessel and stirring was continued for several hours. After storage at reduced temperature for almost a month, the composition was dip coated unto three polyurethane primed PC plaques and cured at 130° C. for 4 hours. The substrates were tested for Taber abrasion; the test results yielded an average delta haze of 1.99%.

Example 4

225 g. water and 332 g. 2-propoxyethanol were combined in a cooled, stirred vessel (about 15° C.) and 163 g. GPTMS was added drop wise to this stirred solution. 22.4 g. itaconic acid was added and allowed to dissolve as the solution warmed to R.T. 310 g. TEOS was added drop wise over a 10 minute period to the clear solution. After about 1 hour of stirring, 53.2 g. Ludox® AM sol was added drop wise with strong stirring. After several days in cold storage, the resulting composition was filtered through 2 um filters and dip coated onto primed 4"×4" PC plaques. The plaques were cured at 130° C. for 4 hrs. The cured coating thickness was about 4.7 um. The plaques were tested for abrasion via Taber testing. The average Taber abrasion test value was 1.16% delta haze.

Example 5

In a chilled reactor, 5000 g. 2-propoxyethanol was combined with 5000 g. water. While stirring, 3060 g. GPTMS was added at a rate of 25/min to 50 ml/min followed by addition of 448 g. itaconic acid which was allowed to dissolve as the mixture warmed to R.T. 4400 g. TEOS was added drop wise (about 25 ml/min) to the clear solution with strong stirring. About one hour thereafter, 1800 g. Nissan NPC-ST silica sol was added to the solution by a slow pour, and the mixture was stirred overnight. A solution of 48 g. NN-dimethylbenzylamine in an equal volume of ethanol was added drop wise to the composition, and the composition was stirred for several hours. The pH of the composition was 4.2, the viscosity was about 7.1 cp, and the solids content was about 25%. After about 5 days of refrigeration, the composition, which contained about 100 ppm fluorocarbon or silicone based leveler surfactants, was dip coated onto six primed PC plaques, cured at 130° C. for 4 hrs, and tested for abrasion resistance via Taber testing. The average Taber abrasion test value was 0.93% delta haze.

Example 6

250 g. water and 250 g. PM glycol ether were combined in a chilled reaction vessel. To this solution was added 153 g. GPTMS drop wise followed by 21 g. itaconic acid which dissolved as the solution warmed to R.T. Then 220 g. TEOS was added drop wise in about 5 minutes, the solution was stirred for about 16 hours in a closed container at R.T. 2.4 g., NN-dimethylbenzyl-amine (in about 10 ml ethanol) was added drop wise to complete the preparation process. After several days of cold storage this composition was coated onto primed PC plaques, cured at 130° C. for 4 hours and Taber abraded. The average delta haze for 5 plaques was 1.1%.

Example 7

5 g. itaconic acid was dissolved in 100 g. water. 180 g. of a 15 wt % solids Nalco 1130 colloidal silica sol (no $Al^{+3}$) was added to the solution under high shear mixing conditions. The mixture was cooled and 153 g. GPTMS was added in drop wise with stirring. After stirring the mixture for about 1 hour, 250 g. PM glycol ether and 16 g. itaconic acid were added, and the mixture was allowed to warm to R.T. 220 g. TEOS was added into the mixture drop wise at about 25 ml/min, and the resulting mixture was stirred continuously overnight in a closed container. After several days in cold storage, the composition was dip coated unto primed PC plaques for determining abrasion resistance. This composition produced a coating that averaged 0.83% delta haze for 5 plaques that underwent Taber testing.

Example 8

250 g. water and 250 g. PM glycol ether were combined in a cooled reactor vessel. 153 g. GPTMS was added drop wise to the solution, followed by 21 g. itaconic acid which was allowed to dissolve as the solution came to R.T. Then, 220 g. TEOS was added drop wise at about the same rate as used in the GPTMS addition. 90 g. Nissan NPC-ST silica sol was poured slowly into the solution. Stirring was continued overnight, thereafter 2.4 g. NN-dimethylbenzylamine (in 30 ml ethanol) was added drop wise to complete the composition. The composition was stored for several days under refrigerated conditions, and then dip coated onto primed PC plaques, cured at 130° C. for 4 hours, and Taber tested. The average delta haze for five plaques (20 test areas) was 0.84%.

Example 9

212 g. water and 332 g. 2-propoxyethanol were combined in a chilled, well stirred reactor. 163 g. GPTMS are added drop wise to the solution over a 6 to 10 minute period. As the mixture was allowed to warm to R.T., 22.4 g. itaconic acid was added to the reactor. When the solution became homogeneous, 265 g. TEOS was added drop wise with strong stirring. After about 1 hour of stirring, 72 g. Ludox® AM (aluminum modified silica sol) was added drop wise with strong agitation. The resulting composition was stored for several days under refrigerated conditions, and then was dip coated onto primed PC plaques, cured at 130° C. for 4 hrs, and Taber tested. The average Taber abrasion test value was 1.16% delta haze.

Example 10

100 g. water and about 5 g. itaconic acid were combined in a stirred vessel. In a separate container, 90 g. Ludox® AM (aluminum modified silica sol) was diluted with 90 g. water and added very rapidly with strong stirring to the acidic solution. This resulting mixture was chilled (to about 15° C.) and 153 g. GPTMS was added drop wise therein. As the solution was warming to R.T., 16 g. itaconic acid was added along with 324 g. 2-propoxyethanol. After the acid was completely dissolved, 310 g. TEOS was added drop wise and stirring was continued overnight. After several days of refrigeration, the resulting composition was dip coated onto three primed 4"×4" PC plaques and cured at 130° C. for 4 hours. The plaques were Taber tested (4 test areas/plaque), yielding an average of 1.10% delta haze. After one year in cold storage, the composition was dip coated onto three primed PC plaques, cured and tested in the same manner. The average Taber abrasion test value was 1.45% delta haze.

Example 11

6.5 g. itaconic acid was dissolved in 100 g. water. 180 g. of a 15 wt % solution of Ludox® AM (aluminum modified silica sol) was added by fine stream to the strongly stirred acidic solution. 153 g. GPTMS was added drop wise the mixture that was chilled to about 15° C. Then, 325 g. 2-propoxyethanol solvent was poured into the mixture, followed by 16 g. itaconic acid. When the itaconic acid was fully dissolved, 146 g. BTSE was added drop wise to the well-stirred mixture at R.T. Stirring was continued overnight, and the composition was homogeneous. The composition was dip coated onto three primed 4"×4" PC plaques and cured at 130° C. for 4 hours. The plaques were tested for Taber abrasion and for weatherability while submerged in boiling water for 8 hours. The plaques all passed the weatherability test, and their average Taber test result was 1.20% delta haze.

Example 12

1000 g. water was combined with 1000 g. 2-propoxyethanol and cooled. 612 g. GPTMS was added drop wise to the solution and stirred. As the solution was warming to R.T., 90 g. itaconic acid was added therein. After dissolution of the acid, 880 g. TEOS was added drop wise (about 25 ml/min) to the well-stirred solution. About 1 hour after the TEOS addition, 360 g. Nissan silica sol was poured slowly into the well-agitated solution. The resulting composition was stirred in a closed container at R.T. overnight and 12 g. NN-dimethylbenzylamine (in 30 ml ethanol) was added drop wise. After several days, the composition was dip coated onto three primed PC plaques, cured, and tested for boiling water stability and Taber abrasion. The plaques did not pass the stability test; their average Taber test result was 0.65% delta haze.

Example 13

26 g. itaconic acid was dissolved in 400 g. water. 360 g. Ludox® AM (aluminum modified silica sol) was diluted with 360 g. water (yielding a 15wt % solids sol), and poured slowly into the itaconic acid solution with strong stirring. The mixture was cooled in a chilled vessel, and thereafter 612 g. GPTMS was added drop wise to it while stirring. As the mixture warmed to R.T., 1300 g. 2-propoxyethanol was poured into the mixture, followed by 64 g. itaconic acid. When the acid fully dissolved, 880 g. TEOS was added drop wise and the mixture was stirred for at least 16 hours. After several days, the resulting composition was dip coated onto three primed PC plaques, and cured at 130° C. of 4 hours. The plaques were tested for Taber abrasion and for stability while submerged in boiling water for 8 hours. The plaques all passed the stability test, and their average Taber test result was 0.84% delta haze.

Example 14

1084 g. water was combined with 1128 g. 2-propoxyethanol in a cooled vessel. With stirring, 652 g. GPTMS was added drop wise to the solution. As the solution was allowed to warn to R.T., 90 g. itaconic acid was added and completely dissolved. Then, 1060 g. TEOS was added to the solution drop wise with strong stirring. In about one hour, 288 g. Nissan NPC-ST sol was poured slowly into the well agitated solution, which was then allowed to stir overnight in the closed container at R.T. The following morning, 10 g. NN-dimethylbenzylamine (in 30 ml ethanol) was added drop wise to the stirred composition. After several days, this composition was dip coated onto three each of polyurethane primed PC plaques and about 3 inch PC lenses, and cured at 130° C. of 4 hours. The plaques were tested for Taber abrasion and for stability while submerged in boiling water for 8 hours; the lenses were tested for Bayer ratio. The plaques did not pass the stability test, and their average Taber test result was 0.56% delta haze. The average Bayer ratio of the lenses were 6.25.

Example 15

1000 g. 2-propoxyethanol and 1000 g. water were combined in a chilled (to about 15° C.) reactor vessel. 612 g. GPTMS was added drop wise (25 to 50 ml/min) to the cooled solution. As the solution was warming to R.T., 90 g. itaconic acid was poured into the vessel and allowed to dissolve while stirring. 584 g. BTSE was added drop wise to the clear solution. After approximately 2 hours of continuous stirring, 360 g. of Nissan NPC-ST silica sol was poured very slowly into the solution. The resulting composition was stirred overnight, and 10 g. NN-dimethylbenzylamine (in 30 ml ethanol) was then added drop wise to the solution. After several days, the composition was dip coated onto three primed PC substrates, cured, and tested for adhesion, abrasion resistance, and boiling water stability. The average Taber abrasion result was 1.13% delta haze; all these plaques passed the severe boiling water test (Table IV).

TABLE III

Abrasion Resistance, Adhesion and Humidity Cycle Tests

| Coating | Taber Abrasion (% delta haze) | | Bayer Ratio | | CHOCA Adhesion | Craze |
|---|---|---|---|---|---|---|
| | * | # | * | # | # | # |
| Of Ex. 12 | 0.65 | 1.18 | 6.28 | 5.60 | Passed | 10 crazed |
| Of Ex. 13 | 0.84 | 1.22 | 6.26 | 4.85 | Passed | Passed |
| Of Ex. 14 | 0.56 | 0.72 | 6.25 | 5.80 | Passed | Passed |
| Com. X | 0.83 | 2.91 | 5.69 | 4.87 | Passed | 10 crazed |

* Testing conducted at Triton Systems, Inc. (3 substrates/test)
Testing conducted at Colts Laboratories, Clearwater, FL (10 substrates/test)
Comm. X—Commercially available siloxane based coating

TABLE IV

Coating Stability in Boiling Water

| Coating | Thickness (μm) | Hours Immersed in Boiling Water | | | | | | | |
|---|---|---|---|---|---|---|---|---|---|
| | | ½ | 1 | 2 | 3 | 4 | 5 | 6 | 7 | 8 |
| Com. X | 3.6 | P | P | P | P | P | C | | | |
| Of Ex. 6 | 4.6 | C | | | | | | | | |
| Of Ex. 7 | 5.2 | C | | | | | | | | |
| Of Ex. 8 | 5.1 | C | | | | | | | | |
| Of Ex. 11 | 3.1 | P | P | P | P | P | P | P | P | P |
| Of Ex. 12 | 3.2 | P | C | | | | | | | |
| Of Ex. 13 | 3.0 | P | P | P | P | P | P | P | P | P |
| Of Ex. 14 | 5.2 | P | C | | | | | | | |
| Of Ex. 15 | 3.0 | P | P | P | P | P | P | P | P | P |

Com. X—Commercially available siloxane based coating
P—Pass (no crazing of surface)
C—Crazed (coating surface)

Test Procedures

Bayer Abrasion Test

The Bayer abrasion test is a standard test used to determine the abrasion resistance of curved/lens surfaces. Per this test, a coated lens is mounted on the bottom of a tray next to a CR-39 reference lens of similar diopter. An abrasive, 500 grams of Alundum Norton ZF#12, is poured evenly over the lenses and the tray, and the tray is oscillated for a total of 600 cycles. The haze and transmittance of both the reference and coated samples are measured with a Haze Gard Plus meter, in accordance with ASTM D1003-00, before and after the test has been performed. The results are expressed as a calculated ratio of the standard CR-39 test lens to the coated lens. This test references ISO CD 15258 (Bayer Abrasion test for ophthalmic lenses), and ASTM F735-94 (Standard Test Method for Abrasion Resistance of Transparent Plastics) and Coatings Using the Oscillating Sand Method.

Taber Abrasion

The Taber test is a standard test for evaluating the abrasion resistance of a flat plastic substrate (i.e. polycarbonate). The test sample (4"×4") is measured for initial haze and transmission and then placed on the test table located on the Taber® Abraser, Model #5130. The test is performed using CS-10F abrasion wheels with a load of 500 grams and for 500 cycles. When the test is complete, the sample is cleaned and the final haze and transmission is measured with a Haze Gard Plus meter, in accordance with ASTM D1003-00. The results are stated as a % delta haze. This test references ASTM D1044-99 (Standard Test Method for Resistance of Transparent Plastics to Surface Abrasion).

Boiling Water Test

This test is used to determine the stability and adhesion of a coating to the base substrate. The coated samples are conditioned to the same specifications as for the Bayer and Taber tests, and the adhesion is tested prior to exposure to boiling water (at about 100° C.). Then, the coated sample is immersed into the boiling water and suspended 1 inch higher than the bottom of the container. The test sample is immersed in water and removed every 15 minutes for observation of craze and/or delamination effects. The test is continued until craze and/or delamination is evident (to a max. of 8 hours).

CHOCA Test

This is a test for evaluating the adhesion of a coating on a substrate surface. The test sample is crosshatched and the adhesion is measured before and after the exposure to varying humidity and varying temperatures during its three eight-hour periods. This test procedure is referenced by the ARCA, Section 5.2.11 (Draft Standard for "Standard Method of the Cycle Humidity Test") and ASTM D2247 (Standard Test Method for Testing Water Resistance of coatings in 100% relative humidity).

Adhesion Test

This test is conducted by making a crosshatch section on a coated plastic surface with a blade, then a tape is attached to the crosshatched section. The tape is removed with a 90° pull action. This test complies with ASTM D3359-02 (Standard Test Methods for Measuring Adhesion by Tape Test.)

Tumble Test

This test method is performed to measure the abrasion resistance of the convex side of a coated and/or uncoated ophthalmic lens. This test is conducted by abrading the surface with several different media in a tumble chamber. The results are then reported as a percent change of haze in transmission. A visual/photographic assessment may also be made. This test is outlined in ASTM D 1003 (Standard Test Method for Haze and Luminous Transmission of Transparent plastics) and The AR Council of America's standard test procedure for the Tumble Test.

Thickness Measurement

This measurement is made to determine coating thickness deposited on a substrate and is performed using a Filmetrics® F-20. Results are expressed in the difference in the refraction of the two materials in terms of thickness.

Impact

This test is performed by submitting a coated substrate (a visor was used herein) to a 0.22 caliber simulated fragment projectile at a velocity of 550–560 ft./sec. This test complies with MIL-STD-662F.

As noted above, the present invention is applicable to abrasion and impact resistant coating compositions, and substrates coated therewith. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those skilled in the art to which the present invention is directed upon review of the present specification. The claims are intended to cover such modifications.

We claim:

1. An abrasion and impact resistant coating composition, comprising:

3-glycidoxypropyltrimethoxy silane (GPTMS) (toughener);

a hardener selected from the group consisting of bis (triethoxysilyl)ethane (BTSE) (hardener) and a mixture of BTSE and tetraethoxysilane (TEOS);

an aqueous alumina modified silica sol; and acid.

2. An abrasion and impact resistant coating composition of claim 1, wherein the composition comprises:

about 12 to 20% of toughener;

about 10 to 30% of hardener;

about 10 to 20% of alumina modified silica sol; and about 0.5 to 5% of acid;

wherein the percentage of each component is weight % of the total composition.

3. An abrasion and impact resistant coating composition of claim 1, further comprising one or more UV absorbers.

4. An abrasion and impact resistant coated substrate comprising a substrate coated with a composition according to claim 1.

5. An abrasion and impact resistant coated substrate according to claim 4, wherein the substrate is a plastic material.

6. An abrasion and impact resistant coated substrate according to claim 5, further comprising a primer layer between the substrate and the coating layer.

7. An abrasion and impact resistant coated substrate according to claim 5, wherein the composition further comprises one or more electrically conductive polymers.

8. An abrasion and impact resistant coated substrate according to claim 5, wherein the plastic substrate is a lens, a window, a sun or moon roof, or a protective visor.

9. An abrasion and impact resistant coated substrate according to claim 4, wherein the substrate is a metal.

10. An abrasion and impact resistant coated substrate according to claim 9, wherein the composition further comprises one or more corrosion inhibitors.

11. An abrasion and impact resistant coated substrate according to claim 9, wherein the metal substrate is a plane, a land vehicle, a sea vessel, or any components thereof.

12. An abrasion and impact resistant coating composition of claim 1, further comprising a catalyst comprising an amine.

13. An abrasion and impact resistant coating composition of claim 1, wherein the coating comprises about 1% to about 30% of BTSE and about 0% to about 29% of TEOS, wherein the percentage of each component is weight % of the total composition.

14. An abrasion and impact resistant coating composition comprising:

3-glycidoxypropyltrimethoxy silane (GPTMS) (toughener);

tetraethoxysilane (TEOS) (hardener);

optional filler;

acid;

catalyst of $Al^{+3}$ modified silica sol; and one or more electrically conductive polymers.

15. An abrasion and impact resistant coating composition of claim 14, wherein the composition comprises:

about 12 to 20% of toughener;

about 10 to 30% of hardener;

about 0 to 20% of filler;

about 0.5 to 5% of acid; and about 5 to 20% of $Al^{+3}$ modified silica sol catalyst, wherein the percentage of each component is weight % of the total composition.

16. An abrasion and impact resistant coating composition of claim 14, further comprising one or more UV absorbers.

17. An abrasion and impact resistant coated substrate comprising a substrate coated with a composition according to claim 14.

18. An abrasion and impact resistant coated substrate according to claim 17, wherein the substrate is a plastic material.

19. An abrasion and impact resistant coated substrate according to claim 18, further comprising a primer layer between the substrate and the coating layer.

20. An abrasion and impact resistant coated substrate according to claim 18, wherein the plastic substrate is a lens, a window, a sun or moon roof, or a protective visor.

21. An abrasion and impact resistant coated substrate according to claim 17, wherein the substrate is a metal.

22. An abrasion and impact resistant coated substrate according to claim 21, wherein the composition further comprises one or more corrosion inhibitors.

23. An abrasion and impact resistant coated substrate according to claim 21, wherein the metal substrate is a plane, a land vehicle, a sea vessel, or any components thereof.

24. An abrasion and impact resistant coating composition comprising:
- 3-glycidoxypropyltrimethoxy silane (GPTMS) (toughener);
- bis(triethoxysilyl)ethane (BTSE) (hardener);
- acid;
- catalyst of $Al^{+3}$ modified silica sol; and
- one or more electrically conductive polymers.

* * * * *